(12) United States Patent
Tsai et al.

(10) Patent No.: US 10,769,508 B2
(45) Date of Patent: Sep. 8, 2020

(54) RADIO FREQUENCY YARN MODULE

(71) Applicant: TAIWAN TEXTILE RESEARCH INSTITUTE, New Taipei (TW)

(72) Inventors: Jie-Shen Tsai, New Taipei (TW); Chien-Lung Shen, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 0 days.

(21) Appl. No.: 16/386,536

(22) Filed: Apr. 17, 2019

(65) Prior Publication Data

US 2020/0167617 A1 May 28, 2020

(30) Foreign Application Priority Data

Nov. 23, 2018 (TW) .............................. 107141942 A

(51) Int. Cl.
*G06K 19/02* (2006.01)
*G06K 19/077* (2006.01)
*G06K 19/07* (2006.01)
*G06K 19/04* (2006.01)

(52) U.S. Cl.
CPC ......... *G06K 19/025* (2013.01); *G06K 19/041* (2013.01); *G06K 19/0723* (2013.01); *G06K 19/07749* (2013.01)

(58) Field of Classification Search
CPC .................................................. G06K 19/025

USPC ........................................................ 235/492
See application file for complete search history.

(56) References Cited

U.S. PATENT DOCUMENTS

2007/0007344 A1  1/2007  Inoue et al.
2007/0241439 A1  10/2007  Chung et al.

FOREIGN PATENT DOCUMENTS

| TW | 200713075 | 4/2007 |
| TW | 200739834 | 10/2007 |
| TW | 200950016 | 12/2009 |
| TW | 201816667 | 5/2018 |
| TW | M566215 U | 9/2018 |
| TW | I643212 B | 12/2018 |

*Primary Examiner* — Allyson N Trail
(74) *Attorney, Agent, or Firm* — McClure, Qualey & Rodack, LLP

(57) ABSTRACT

A radio frequency yarn module includes a first flexible substrate, a radio frequency assembly, and a first packaging adhesive. The first flexible substrate is strip shaped and has a thickness ranging from 40 μm to 60 μm. The radio frequency assembly is disposed on the first flexible substrate and includes a first conductive layer, a second conductive layer, and a radio frequency chip. Each of the first and the second conductive layers is disposed on the first flexible substrate and has a thickness ranging from 3 μm to 10 μm. Extending paths of the first and the second conductive layers are respectively same as extending paths of a first and a second portions of the first flexible substrate. The radio frequency chip is disposed on the first conductive layer and the second conductive layer. The first packaging adhesive covers the radio frequency assembly.

10 Claims, 5 Drawing Sheets

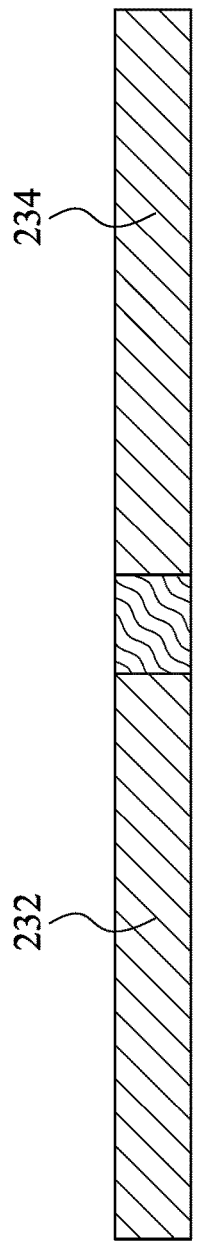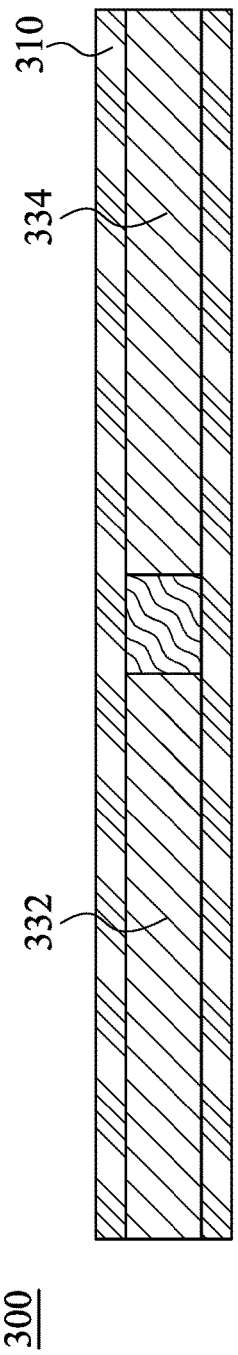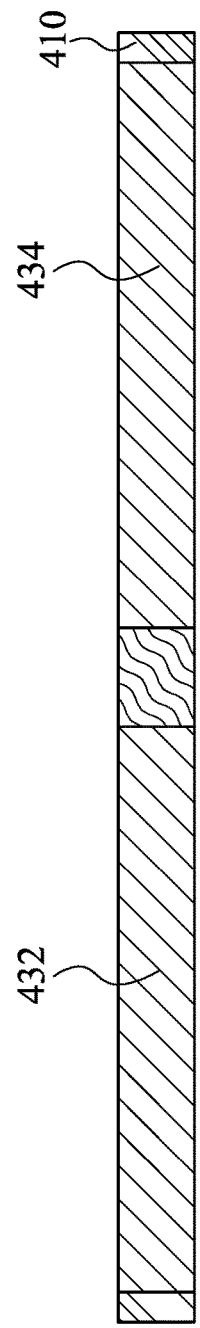

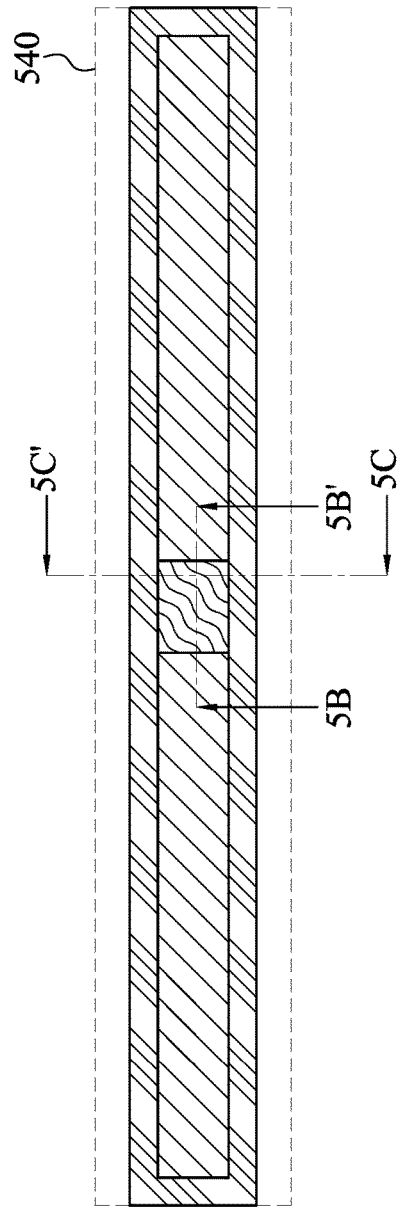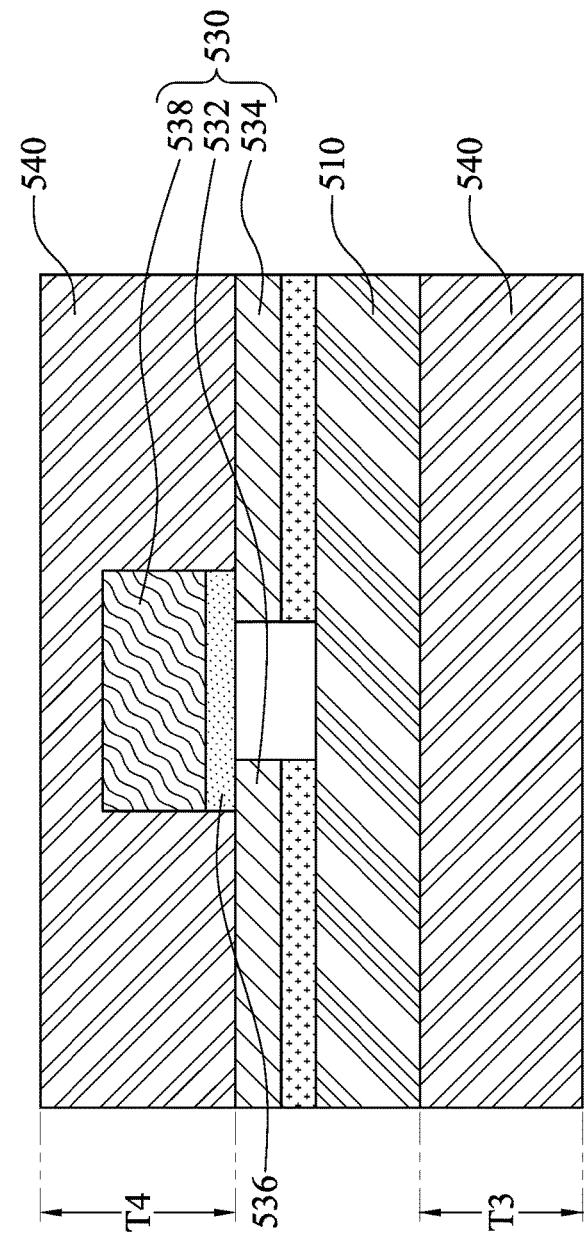

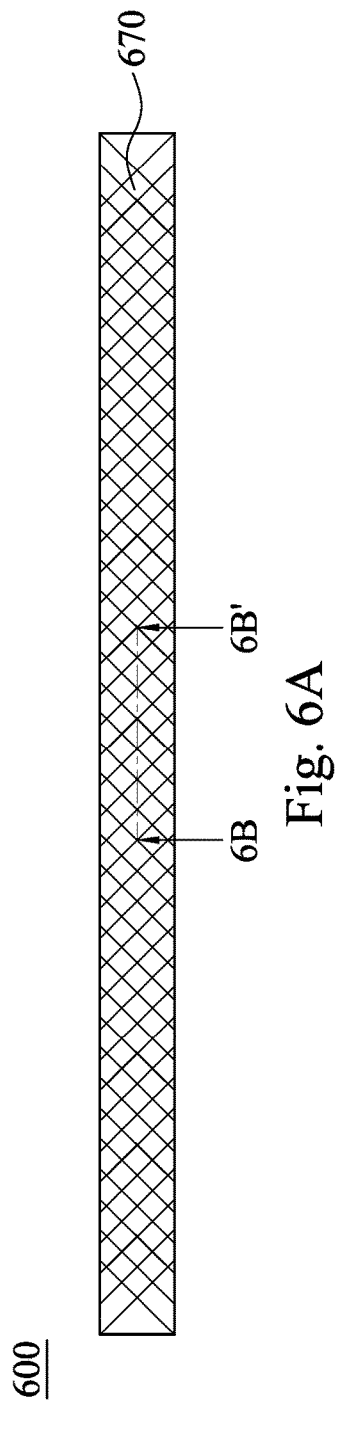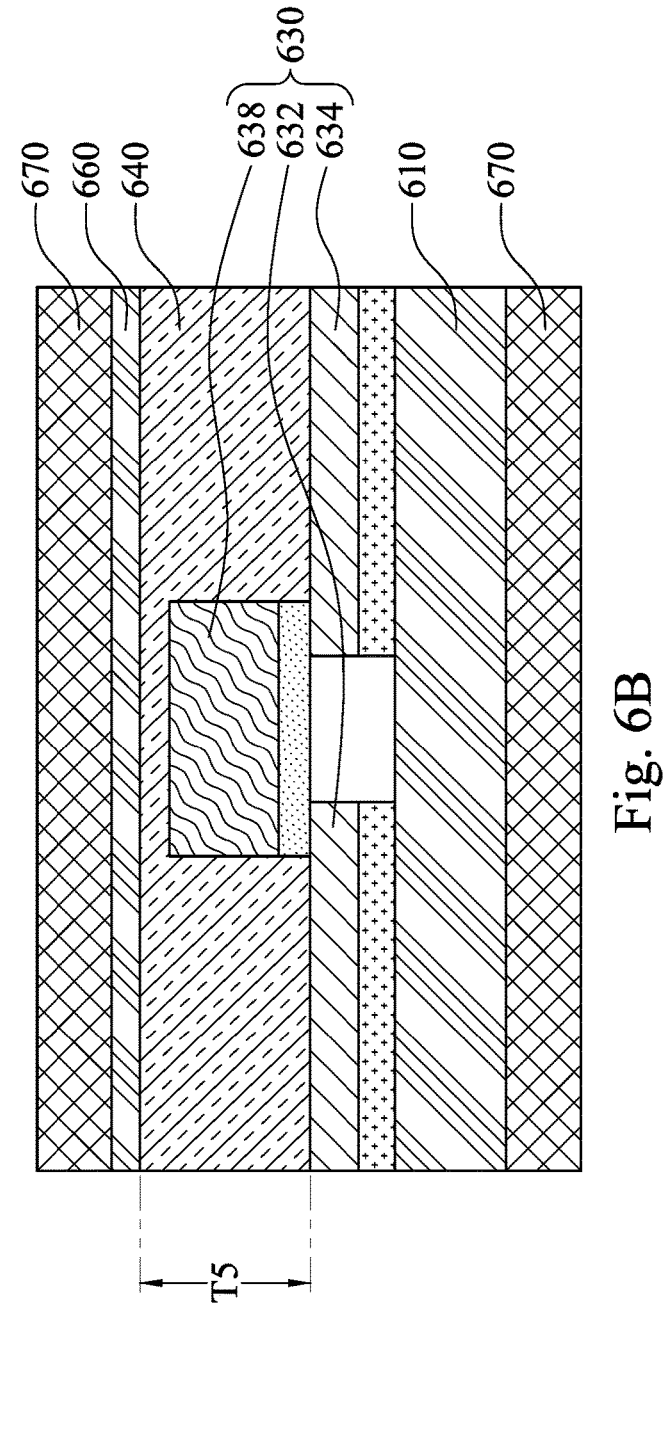

RADIO FREQUENCY YARN MODULE

RELATED APPLICATIONS

This application claims priority to Taiwanese Application Serial Number 107141942, filed Nov. 23, 2018, which is herein incorporated by reference.

BACKGROUND

Technical Field

The present disclosure relates to a radio frequency yarn module.

Description of Related Art

In recent years, with the development of the internet of things (IoT) and wearable devices, many consumer products have been designed to be able to integrate with electronic components, thereby enabling the consumer products to achieve an interconnected network. By the IoT, actual items can be connected to the internet, such that the specific location of these actual items are available to be found. On the other hand, by connecting the actual items to the internet, the actual items can be centrally managed and controlled by a central computer, which will be advantageous to search for their location, prevent them from theft, or achieve other similar automation functions.

In order to implement the IoT, the consumer products are designed to be combined with radio frequency identification (RFID) tags, which can achieve data exchange without contact with any device. In this regard, how to combine the consumer products with the RFID has become one of the important topics in the industry.

SUMMARY

An aspect of the present disclosure is to provide a radio frequency yarn module including a first flexible substrate, a radio frequency assembly, and a first packaging adhesive. The first flexible substrate is strip shaped and has a thickness ranging from 40 µm to 60 µm. The radio frequency assembly is disposed on the first flexible substrate and includes a first conductive layer, a second conductive layer, and a radio frequency chip. The first conductive layer is disposed on the first flexible substrate and has a thickness ranging from 3 µm to 10 µm, in which an extending path of the first conductive layer is the same as an extending path of a first portion of the first flexible substrate. The second conductive layer is disposed on the first flexible substrate and has a thickness ranging from 3 µm to 10 µm, in which an extending path of the second conductive layer is the same as an extending path of a second portion of the first flexible substrate. The radio frequency chip is disposed on the first and the second conductive layers and has a first pin and a second pin. The first pin is electrically connected to the first conductive layer, and the second pin is electrically connected to the second conductive layer. The first packaging adhesive covers the radio frequency assembly, so as to make the radio frequency assembly be disposed between the first flexible substrate and the first packaging adhesive.

In some embodiments, the first packaging adhesive is a silica gel and has a thickness ranging from 200 µm to 900 µm, and the radio frequency assembly and the first flexible substrate are encapsulated by the first packaging adhesive.

In some embodiments, the radio frequency yarn module further includes outer yarns weaved to wrap an outer surface of the radio frequency yarn module.

In some embodiments, the radio frequency yarn module further includes a connection layer disposed between the first flexible substrate and the radio frequency assembly.

In some embodiments, the radio frequency yarn module further includes a second flexible substrate disposed on the first packaging adhesive and having a thickness ranging from 5 µm to 15 µm.

In some embodiments, the first packaging adhesive is an acrylic adhesive and has a thickness ranging from 120 µm to 270 µm.

In some embodiments, the radio frequency yarn module further includes a second packaging adhesive covering the first flexible substrate, and the first flexible is located between the first packaging adhesive and the second packaging adhesive. The first packaging adhesive has a thickness ranging from 50 µm to 100 µm, and the second packaging adhesive has a thickness ranging from 30 µm to 70 µm.

In some embodiments, the first packaging adhesive further covers the first flexible substrate.

In some embodiments, the radio frequency yarn module further includes an anisotropic conductive film (ACF) disposed between the first conductive layer and the radio frequency chip and between the second conductive layer and the radio frequency chip, so as to fix the first pin and the second pin on the first conductive layer and the second conductive layer respectively.

In some embodiments, the first flexible substrate has a pair of short sides and a pair of long sides, and each of the short sides of the first flexible substrate has a length ranging from 1 mm to 2.5 mm.

BRIEF DESCRIPTION OF THE DRAWINGS

FIG. 2 is a schematic top view of a radio frequency yarn module according to a second embodiment of the present disclosure;

FIG. 3 is a schematic top view of a radio frequency yarn module according to a third embodiment of the present disclosure;

FIG. 4 is a schematic top view of a radio frequency yarn module according to a fourth embodiment of the present disclosure;

FIG. 5A is a schematic top view of a radio frequency yarn module according to a fifth embodiment of the present disclosure;

FIG. 5B is a cross-sectional enlarged view taken along line 5B-5B' of FIG. 5A;

FIG. 6A is a schematic top view of a radio frequency yarn module according to a sixth embodiment of the present disclosure; and FIG. 6B is a cross-sectional enlarged view taken along line 6B-6B' of FIG. 6A.

DETAILED DESCRIPTION

Figure 1A:
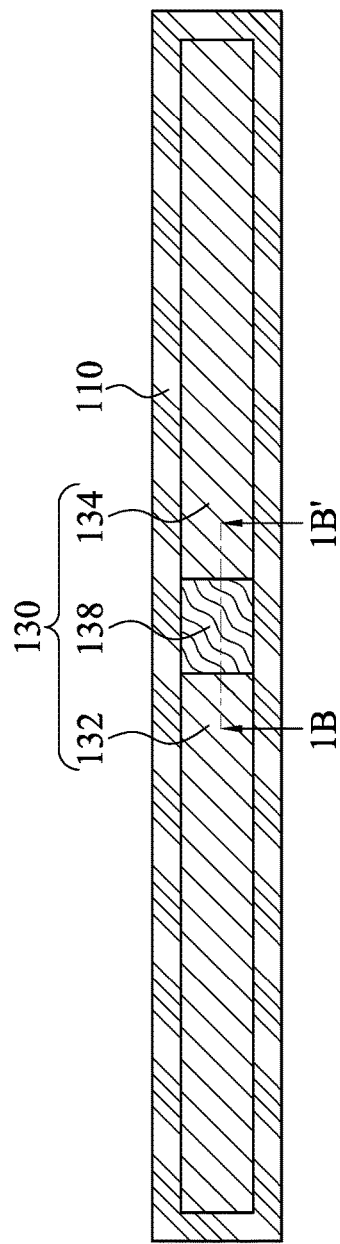
FIG. 1A is a schematic top view of a radio frequency yarn module according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms "first," "second," etc., may be used herein to describe various elements, components, areas, or layers, these elements should not be limited by these terms. These terms are used to distinguish one element, component, area, or layer from another. For example, a first element could be termed a second element, and, similarly, a second element could be termed a first element, without departing from the scope of the embodiments. As used herein, the term "and/or" includes any and all combinations of one or more of the associated listed items.

A radio frequency yarn module of the present disclosure includes a radio frequency assembly, thereby providing functionality for the radio frequency yarn module. Moreover, the radio frequency yarn module can have water washing resistant and acid-and-alkali resistant by using an encapsulation material.

Figure 1B:
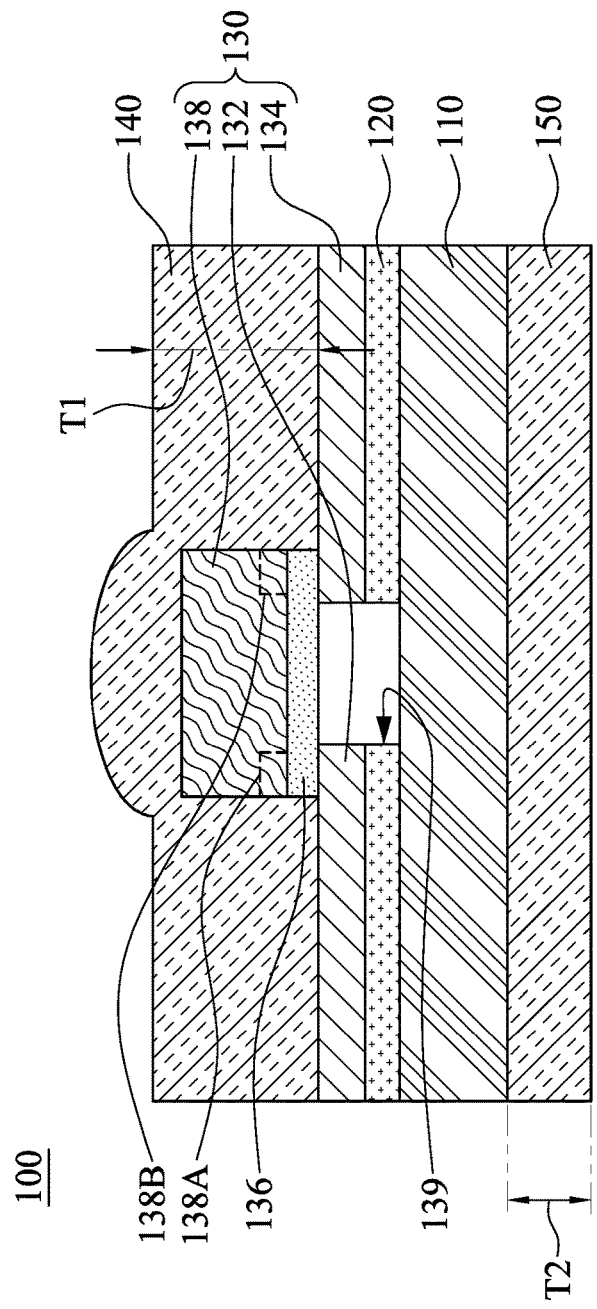
FIG. 1B is a cross-sectional enlarged view taken along line 1B-1B' of FIG. 1A.

Reference is made to FIGS. 1A and 1B. FIG. 1A is a schematic top view of a radio frequency yarn module 100 according to a first embodiment of the present disclosure, and FIG. 1B is a cross-sectional enlarged view taken along line 1B-1B' of FIG. 1A. In order not to make FIG. 1A complicated, no dots pattern is shown in a packaging adhesive illustrated in FIG. 1A. In the present embodiment, a radio frequency yarn module 100 includes a first flexible substrate 110, a connection layer 120, a radio frequency assembly 130, a first packaging adhesive 140, and a second packaging adhesive 150.

The first flexible substrate 110 is strip shaped. Specifically speaking, the first flexible substrate 110 can have a pair of short sides and a pair of long sides, and each of the short sides of the first flexible substrate 110 has a length ranging from 1 mm to 2.5 mm. The first flexible substrate 110 has a thickness ranging from 40 µm to 60 µm. Exemplary materials of the first flexible substrate 110 may include polyethylene terephthalate (PET), polyurethane (TPU), polyammonium (PI), or polypropylene (PP).

The radio frequency assembly 130 is disposed on the first flexible substrate 110, and the connection layer 120 is disposed between the first flexible substrate 110 and the radio frequency assembly 130. The connection layer 120 may be formed from an adhesive, so as to fix the radio frequency assembly 130 on the first flexible substrate 110.

In the present embodiment, the radio frequency assembly 130 includes a first conductive layer 132, a second conductive layer 134, an anisotropic conductive film (ACF) 136, and a radio frequency chip 138. The first conductive layer 132 and the second conductive layer 134 are collectively disposed on the first flexible substrate 110, in which the exemplary materials of either the first conductive layer 132 or the second conductive layer 134 include metal, such as aluminum, tin or silver. Specifically speaking, the first conductive layer 132 and the second conductive layer 134 can be bonded on the first flexible substrate 110 by the connection layer 120, so as to prevent that the first conductive layer 132 and the second conductive layer 134 are detaching from the first flexible substrate 110. In addition, each of the first conductive layer 132 and the second conductive layer 134 has a thickness ranging from 3 µm to 10 µm.

The first conductive layer 132 and the second conductive layer 134 can be formed from the same material. For example, the first conductive layer 132 and the second conductive layer 134 can be formed by patterning a single material. The formed first conductive layer 132 and the formed second conductive layer 134 are separated from each other, such that a gap 139 exists therebetween, which would prevent the first conductive layer 132 and the second conductive layer 134 from becoming short circuit due to physic contact.

The ACF 136 is disposed on the first conductive layer 132 and the second conductive layer 134, in which the disposition of the ACF 136 can be performed by coating. However, the present disclosure is not limited to such disposition. In other embodiments, the disposition of the ACF 136 can be performed by dispensing, painting, or pasting. The radio frequency chip 138 is disposed on the first conductive layer 132 and the second conductive layer 134, in which the radio frequency chip 138 can be adhered to the first conductive layer 132 and the second conductive layer 134 through the ACF 136 by performing a hot-pressure process.

The radio frequency chip 138 has a first pin 138A and a second pin 138B, in which the first pin 138A and the second pin 138B can be electrically and respectively connected to the first conductive layer 132 and the second conductive layer 134 through the ACF 136. In this regard, by directional conductivity of the ACF 136, even if the ACF 136 overflows into the gap 139, it would not make the first conductive layer 132 and the second conductive layer 134 become short circuit which is caused by physic contact. Moreover, in addition to providing the electrical communication, the ACF 136 can make the first pin 138A and the second pin 138B fix on the first conductive layer 132 and the second conductive layer 134, respectively.

Because of that the operation conditions of the radio frequency chip 138 are related to the load impedance thereof and that the load impedance is related to the impedances of the first conductive layer 132 and the second conductive layer 134, the load impedance can be tuned to conform with the operation conditions of the radio frequency chip 138 by adjusting an extending length of either the first conductive layer 132 or the second conductive layer 134 on the first flexible substrate 110.

In the present embodiment, each of the first conductive layer 132 and the second conductive layer 134 is strip shaped. The first conductive layer 132 covers a first portion of the first flexible substrate 110 (i.e., a portion of the first flexible substrate 110 that is underlying the first conductive layer 132), and the second conductive layer 134 covers a second portion of the first flexible substrate 110 (i.e., a portion of the first flexible substrate 110 that is underlying the second conductive layer 134). As such, the extending paths of the first conductive layer 132 and the second conductive layer 134 are respectively same as extending paths of the first portion and the second portion of the first flexible substrate 110. By controlling the extending lengths of the first conductive layer 132 and the second conductive layer 134, the impedances of the first conductive layer 132 and the second conductive layer 134 can be tuned, thereby making the load impedance of the radio frequency chip 138 conform with the operation conditions.

The first packaging adhesive 140 covers the radio frequency assembly 130, so as to make the radio frequency assembly 130 be disposed between the first flexible substrate 110 and the first packaging adhesive 140. More particularly, the first packaging adhesive 140 covers the first flexible substrate 110, the first conductive layer 132, the second conductive layer 134, and the radio frequency chip 138, such that the radio frequency assembly 130 can be disposed between the first flexible substrate 110 and the first packaging adhesive 140. Furthermore, the second packaging adhesive 150 can covers the first flexible substrate 110, so as to make the first flexible substrate 110 be between the first packaging adhesive 140 and the second packaging adhesive 150. In the present embodiment, either the first packaging adhesive 140 or the second packaging adhesive 150 may be formed from TE ink. The first packaging adhesive 140 has a thickness T1 ranging from 50 μm to 100 μm, and the second adhesive 150 has a thickness T2 ranging from 30 μm to 70 μm. In addition, either the first packaging adhesive 140 or the second packaging adhesive 150 can be formed by coating, such as using a scraper to perform coating.

By the configuration above, the first packaging adhesive 140 and the second packaging adhesive 150 can collectively serve as an encapsulation structure and provide high temperature resistant, water washing resistant, and acid-and-alkali resistant for the layers and elements therebetween, which would be advantageous to improve the reality and the service life of the radio frequency yarn module 100. For example, after immersing the radio frequency yarn module 100 in deionized (DI) water for twenty hours with temperature of 60 degrees Celsius, the radio frequency yarn module 100 can keep its electrical character the same. For example, after immersing the radio frequency yarn module 100 in alkaline bath having PH of 12 for forty minutes with temperature of 100 degrees Celsius, the radio frequency yarn module 100 can keep its electrical character the same. For example, after immersing the radio frequency yarn module 100 in acid bath having PH of 4 for four hours with temperature of 135 degrees Celsius, the radio frequency yarn module 100 can keep its electrical character the same. On the other hand, the layers of the radio frequency yarn module 100 may be flexible due to their material properties or thickness. For example, under a condition in which each of the first conductive layer 132 and the second conductive layer 134 is made of a metal material and has a thickness ranging from 3 μm to 10 μm, each of the first conductive layer 132 and the second conductive layer 134 can be flexible. Therefore, the radio frequency yarn module 100 is suitable to serve as a wireless electronic tag which can withstand a process with high temperature dyeing.

Each of the layers of the radio frequency yarn module 100 can be manufactured by a roll to roll (R2R) process, such that the radio frequency yarn module 100 is suitable for mass producing. Specifically speaking, the first conductive layer 132, the second conductive layer 134, the first packaging adhesive 140, and the second packaging adhesive 150 can be formed on a flexible substrate by using a R2R process, such that a plurality of radio frequency yarn modules can be disposed on the flexible substrate. Thereafter, a process such as a cutting process can be performed to separate the radio frequency yarn modules from each other. During the cutting process, the desired size of the radio frequency yarn module can be determined according to the subsequent application environment with respect to the radio frequency yarn module.

As shown in FIG. 1A, in the present embodiment, the short sides and long sides of the first flexible substrate 110 do not coincide with edges of the first conductive layer 132 and the second conductive layer 134. That is, edges of the first flexible substrate 110 are separated from edges of the first conductive layer 132 and the second conductive layer 134 by at least one distance, which will be advantageous to preform wrapping the radio frequency yarn module 100.

In more detail, since regions of the first flexible substrate 110 near the edges of the first flexible substrate 110 are not covered by the conductive layers, these regions may serve as buffer regions, so as to improve wrapping reliability and wrapping strength. However, the present disclosure is not limited thereto. In other embodiments, the first flexible substrate 110 can be cut to have the edges that partially or entirely coincide with the edges of the first conductive layer 132 and the second conductive layer 134, as shown in FIG. 2, FIG. 3, and FIG. 4. FIG. 2, FIG. 3, and FIG. 4 are schematic top views of radio frequency yarn modules 200, 300, and 400 according to a second embodiment, a third embodiment, and a fourth embodiment of the present disclosure, respectively.

As shown in FIG. 2, a first flexible substrate (i.e., which is covered by a first conductive layer 232 and a second conductive layer 234) is cut to have short edges and long edges that coincide with edges of the first conductive layer 232 and the second conductive layer 234, which will be advantageous to minify the overall size of the radio frequency yarn module 200. As shown in FIG. 3, a first flexible substrate 310 is cut to have short edges that coincide with edges of a first conductive layer 332 and a second conductive layer 334 and have long sides that do not coincide with edges of the first conductive layer 332 and the second conductive layer 334, which will be advantageous to reduce complexity with respect to a cutting process. As shown in FIG. 4, a first flexible substrate 410 is cut to have long edges that coincide with edges of a first conductive layer 432 and a second conductive layer 434 and have short sides that do not coincide with edges of the first conductive layer 432 and the second conductive layer 434, thereby being suitable for forming extra structures at opposite ends of the radio frequency yarn module 400.

Figure 5C:
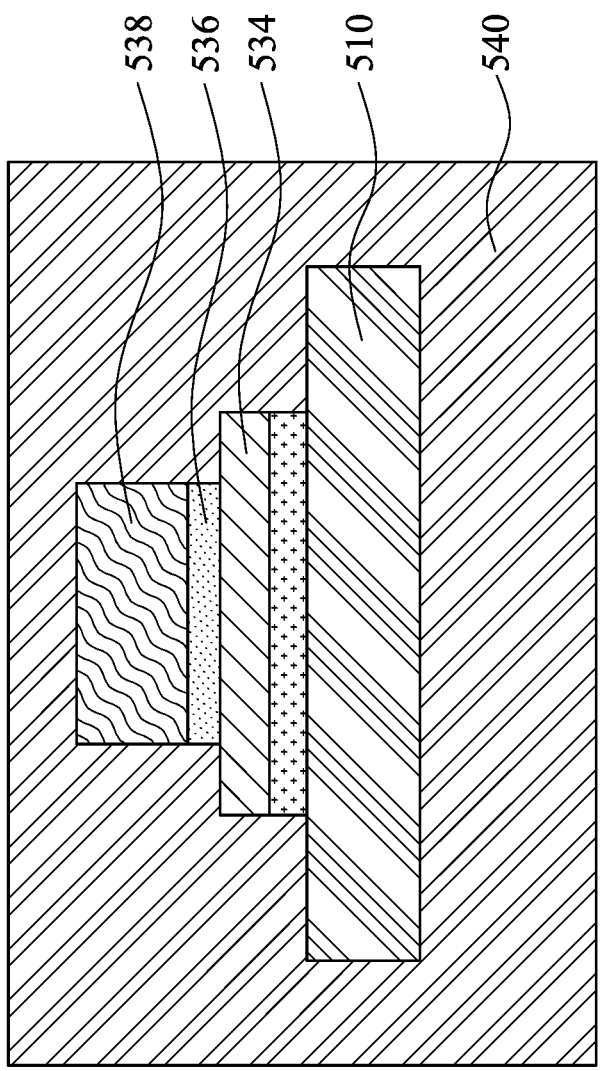
FIG. 5C is a cross-sectional enlarged view taken along line 5C-5C' of FIG. 5A.

Reference is made to FIG. 5A, FIG. 5B, and FIG. 5C. FIG. 5A is a schematic top view of a radio frequency yarn module 500 according to a fifth embodiment of the present disclosure. FIG. 5B is a cross-sectional enlarged view taken along line 5B-5B' of FIG. 5A. FIG. 5C is a cross-sectional enlarged view taken along line 5C-5C' of FIG. 5A. In order not to make FIG. 5A complicated, no dots pattern is shown in a packaging adhesive illustrated in FIG. 5, and an outline of the packaging adhesive is illustrated as a dotted line.

A difference between the present embodiment and the first embodiments includes that a first packaging adhesive 540 is a silica gel which encapsulates a radio frequency assembly 530 and a first flexible substrate 510. Specifically speaking, after the radio frequency chip 538 is adhered on a first conductive layer 532 and a second conductive layer 534 by an ACF 536, an impregnation process can be performed to form the first packaging adhesive 540 around the radio frequency yarn module 500. Further, according to different process, two ends of the first flexible substrate 510 may be exposed from the first packaging adhesive 540. For example, under a condition in which a plurality of radio frequency yarn modules are formed on a flexible substrate by a R2R process, an impregnation process can be performed prior to a cutting process, such that the flexible substrate is exposed at two ends of each of the radio frequency yarn modules after performing the cutting process.

The first packaging adhesive 540 has a thickness ranging from 200 μm to 900 μm. Herein, the term "the thickness of the first packaging adhesive 540" may mean either a thickness T3 labeled in FIG. 5B (i.e., a thickness below the flexible substrate) or a thickness T4 labeled in FIG. 5B (i.e., a thickness above the conductive layer). By the configuration above, the first packaging adhesive 540 can provide water washing resistant and acid-and-alkali resistant for the radio frequency assembly 530. In addition, although the first packaging adhesive 540 of FIG. 5C is illustrated as being rectangular, an outline of the first packaging adhesive 540 may be circular, elliptical, or other polygonal in other embodiments.

Reference is made to FIG. 6A and FIG. 6B. FIG. 6A is a schematic top view of a radio frequency yarn module 600 according to a sixth embodiment of the present disclosure, and FIG. 6B is a cross-sectional enlarged view taken along line 6B-6B' of FIG. 6A. A difference between the present embodiment and the first embodiments includes that a first packaging adhesive 640 of the present embodiment is an acrylic adhesive, such as epoxy, and that the radio frequency yarn module 600 further includes a second flexible substrate 660 and a plurality of outer yarns 670.

The second flexible substrate 660 is disposed on the first packaging adhesive 640 to cover an encapsulation structure formed by the first packaging adhesive 640. The second flexible substrate 660 can be made of the same material as a first flexible substrate 610, such as PET, TPU, PI, or PP. The first flexible substrate 610 has a thickness T5 ranging from 120 μm to 270 μm, and the second flexible substrate 660 has a thickness ranging from 5 μm to 15 μm.

By such thickness configuration, the first packaging adhesive 640 can provide high temperature resistant, water washing resistant, and acid-and-alkali resistant for a radio frequency assembly 630 (i.e., which includes a first conductive layer 632, a second conductive layer 634, and a radio frequency chip 638). In addition to providing the water washing resistant and acid-and-alkali resistant, the structural strength of the encapsulation structure can be further enhanced by the second flexible substrate 660, so as to prevent the encapsulation structure from affecting by the outer yarns 670.

The outer yarns 670 are weaved to wrap an outer surface of the radio frequency yarn module 600 to enhance the overall structural strength of the radio frequency yarn module 600, thereby preventing the radio frequency yarn module 600 from fracturing. The outer yarns 670 can be disposed on the outer surface of the radio frequency yarn module 600 in a way of 8-shaped wrapping. The number of the outer yarns 670 may range from 4 to 32. The less number of the outer yarns 670 is utilized to wrap, the production speed of the radio frequency yarn module 600 could be faster. In contrast, the more number of the outer yarns 670 is utilized to wrap, the structural strength of the radio frequency yarn module 600 could be stronger. In other words, since the number of the outer yarns 670 of the present embodiment ranges from 4 to 32, it can achieve enough production speed and also enough structural strength.

The effects of the high temperature resistant, the water washing resistant, and the acid-and-alkali resistant upon the radio frequency yarn modules as described previously embodiments are shown in TABLE I as followings.

TABLE I the comparison among the comparative examples and the various experiments with respect to the effects of the high temperature resistant, the water washing resistant, and the acid-and-alkali resistant.

| | Original signal detection distance | high temperature resistant and water washing resistant (signal detection distance) | alkali resistant (signal detection distance) | acid resistant (signal detection distance) |
|---|---|---|---|---|
| comparative example 1 | ≥250 cm | no signal | no signal | no signal |
| comparative example 2 | ≥250 cm | no signal | no signal | no signal |
| experiment 1 | ≥250 cm | ≥250 cm | ≥250 cm | ≥250 cm |
| experiment 2 | ≥250 cm | ≥250 cm | ≥250 cm | ≥250 cm |
| experiment 3 | ≥250 cm | ≥250 cm | ≥250 cm | ≥250 cm |

As shown in TABLE I, which is the comparison among the comparative examples and the various experiments with respect to the effects of the high temperature resistant, the water washing resistant, and the acid-and-alkali resistant, the comparative example 1 is a commercially available sheet-shaped RFID electronic tag. The comparative example 2 is a commercially available sheet-shaped RFID electronic tag which is wrapped by yarns. The experiment 1 has the same structure configuration as the first embodiment, in which the structure configuration is encapsulated by TE ink (e.g., which is purchased from Tsaui Mining Industrial Co., Ltd), and the experiment 1 has a thickness ranging from 250 μm to 550 μm. The experiment 2 has the same structure configuration as the fifth embodiment, in which the structure configuration is encapsulated by silica gel (e.g., which is purchased from 3M company), and the experiment 2 has a thickness ranging from 550 μm to 1800 μm. The experiment 3 has the same structure configuration as the sixth embodiment, in which the structure configuration is encapsulated by acrylic adhesive (e.g., which is purchased from 3M company), and the experiment 3 has a thickness ranging from 315 μm to 340 μm. Furthermore, the test for the high temperature resistant and the water washing resistant is performed by a testing method according to AATCC 61-2010 1B. During the test, samples corresponding to the comparative example 1, the comparative example 2, the experiment 1, the experiment 2, and the experiment 3 are put into a steel cup filled with DI water with temperature of 60 degrees Celsius. Thereafter, after twenty hours of dyeing test in the steel cup, the samples are taken out, and then signal detectable ability of each of the samples is measured at the signal detection distance of 250 cm. Tests for the acid resistant and for the alkali resistant can be performed similarly to the test for the high temperature resistant and the water washing resistant. A difference between the test for the alkali resistant and the test for the high temperature resistant and the water washing resistant is that the DI water is replaced by a solution having pH of 12 and that the testing temperature and period are modified as 100 degrees Celsius and 40 minutes. A difference between the test for the acid resistant and the test for the high temperature resistant and the water washing resistant is that the DI water is replaced by a solution having pH of 4 and that the testing temperature and period are modified as 135 degrees Celsius and 4 hours. Accordingly, such modifications may make the test more conform with conditions of a process for dyeing fabric.

By TABLE I, It can be found that the radio frequency yarn module of the experiment 1, the experiment 2, and the experiment 3 of the present disclosure can keep the signal detection distance being equal to or over 250 cm after the tests for high temperature resistant and the water washing resistant, for the alkali resistant, and for the acid resistant, and therefore the radio frequency yarn module of the experiment 1, the experiment 2, and the experiment 3 of the present disclosure are suitable for a process for dyeing fabric in industrial aspect. In contrast, regarding the commercially available RFID electronic tags of the comparative example 1 and the comparative example 2, no signal is detected from these electronic tags after the tests. Accordingly, the commercially available RFID electronic tags of the comparative example 1 and the comparative example 2 do not have high temperature resistant and the water washing resistant as well as the alkali resistant and the acid resistant, and hence these electronic tags are not suitable for a process for dyeing fabric.

As described above, the radio frequency yarn module of the present disclosure includes the first flexible substrate, the radio frequency assembly, and the first packaging adhesive. The radio frequency assembly includes the conductive layers and the radio frequency chip and is disposed on the first flexible substrate. The first packaging adhesive covers the first flexible substrate and the radio frequency assembly. The first packaging adhesive has the thickness that is sufficient to make the radio frequency yarn module have the enough high temperature resistant, the enough water washing resistant, and the enough acid-and-alkali resistant, such that the radio frequency yarn module is suitable for a process for dyeing fabric. Furthermore, the radio frequency yarn module of the present disclosure can be manufactured by a R2R process, and the configurations of elements and materials of the radio frequency yarn module allow the radio frequency yarn module to have enough structure strength under the low thickness, which will be advantageous to disposing the radio frequency yarn module of the present disclosure in cloth or apparel.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A radio frequency yarn module, comprising:
   a first flexible substrate that is strip shaped and has a thickness ranging from 40 μm to 60 μm;
   a radio frequency assembly disposed on the first flexible substrate and comprising:
      a first conductive layer disposed on the first flexible substrate and having a thickness ranging from 3 μm to 10 μm, wherein an extending path of the first conductive layer is the same as an extending path of a first portion of the first flexible substrate;
      a second conductive layer disposed on the first flexible substrate and having a thickness ranging from 3 μm to 10 μm, wherein an extending path of the second conductive layer is the same as an extending path of a second portion of the first flexible substrate; and
      a radio frequency chip disposed on the first and the second conductive layers and having a first pin and a second pin, wherein the first pin is electrically connected to the first conductive layer, and the second pin is electrically connected to the second conductive layer; and
   a first packaging adhesive covering the radio frequency assembly, so as to make the radio frequency assembly be disposed between the first flexible substrate and the first packaging adhesive.

2. The radio frequency yarn module of claim 1, wherein the first packaging adhesive is a silica gel and has a thickness ranging from 200 μm to 900 μm, and the radio frequency assembly and the first flexible substrate are encapsulated by the first packaging adhesive.

3. The radio frequency yarn module of claim 1, further comprising a plurality of outer yarns weaved to wrap an outer surface of the radio frequency yarn module.

4. The radio frequency yarn module of claim 3, further comprising a connection layer disposed between the first flexible substrate and the radio frequency assembly.

5. The radio frequency yarn module of claim 1, further comprising a second flexible substrate disposed on the first packaging adhesive and having a thickness ranging from 5 μm to 15 μm.

6. The radio frequency yarn module of claim 5, wherein the first packaging adhesive is an acrylic adhesive and has a thickness ranging from 120 μm to 270 μm.

7. The radio frequency yarn module of claim 1, further comprising a second packaging adhesive covering the first flexible substrate, wherein the first flexible is located between the first packaging adhesive and the second packaging adhesive, the first packaging adhesive has a thickness ranging from 50 μm to 100 μm, and the second packaging adhesive has a thickness ranging from 30 μm to 70 μm.

8. The radio frequency yarn module of claim 1, wherein the first packaging adhesive further covers the first flexible substrate.

9. The radio frequency yarn module of claim 1, further comprising an anisotropic conductive film (ACF) disposed between the first conductive layer and the radio frequency chip and between the second conductive layer and the radio frequency chip, so as to fix the first pin and second pin on the first conductive layer and the second conductive layer respectively.

10. The radio frequency yarn module of claim 1, wherein the first flexible substrate has a pair of short sides and a pair of long sides, and each of the short sides of the first flexible substrate has a length ranging from 1 mm to 2.5 mm.

* * * * *